United States Patent [19]

Cowlishaw

[11] Patent Number: 4,725,828

[45] Date of Patent: Feb. 16, 1988

[54] COLOR DISPLAY APPARATUS AND METHOD OF CODING A COLOR IMAGE

[75] Inventor: Michael F. Cowlishaw, Winchester, United Kingdom

[73] Assignee: International Business Machines Corporation, Armonk, N.Y.

[21] Appl. No.: 701,902

[22] Filed: Feb. 15, 1985

[30] Foreign Application Priority Data

Feb. 15, 1984 [EP] European Pat. Off. ........ 84300961.4

[51] Int. Cl.[4] ............................................. G09G 1/16
[52] U.S. Cl. .................... 340/703; 340/701; 358/78; 358/80
[58] Field of Search .............. 340/701, 703; 358/75, 358/78, 13, 28, 22, 81, 80

[56] References Cited

U.S. PATENT DOCUMENTS 4,058,828 11/1977 Ladd ..................................... 358/80
4,183,046 1/1980 Dalke et al. ......................... 340/703
4,270,141 5/1981 Sakamuto ............................. 358/78

FOREIGN PATENT DOCUMENTS 0030159 6/1981 European Pat. Off. ............ 340/701

OTHER PUBLICATIONS

"Positional Color Coding-A Color Identification System that Combines Color and Intensity", *Information Display*, vol. 11, No. 6, Jun., 1975, pp. 22-25, Hendrickson.
Electronic Design, vol. 30, No. 24, Nov. 1982, pp. 127-131, Waseca, Minn., Denville, N.J., U.S.; G. M. Murch et al: "Color Display Clears Up Analysis of Digital Logic Data".
Computer Vision, Graphics and Image Processing, vol. 24, No. 3, Dec. 1983, pp. 329-346, Academic Press, Inc., New York, U.S.: S. H. Algie: "Resolution and Tonal Continuity in Bilevel Printed Picture Quality".
Computer Design, vol. 21, No. 7, Jul. 1982, pp. 123-130, Winchester, Mass., U.S.; D. H. Straayer: "Hoisting the Color Standard".
Electronic Design, vol. 29, No. 14, 9th Jul., 1981, pp. 31-32, Denville, NJ., U.S.; L. Yencharis: "Computer--Graphics Software Enhances Micro Systems with More User Accessibility".
Nachrichtentechnische Zeitschrift, NTZ, vol. 33, No. 5, May 1980, pp. 322-323, Berlin, DE; H. Niemeyer: "Schmalbandige Ubertragung Farbinger Festbilder".

*Primary Examiner*—Gerald L. Brigance
*Attorney, Agent, or Firm*—Joseph J. Connerton; Frederick D. Poag

[57] ABSTRACT

The invention provides a display apparatus for producing a color image in which the color of each picture element is defined by the intensities of component red, blue and green primaries and is coded as a binary number having r bits defining $2^r$ intensity levels for red, g bits defining $2^g$ intensity levels for green, and b bits defining $2^b$ intensity levels for blue, where $g \leq 7$, $(g-r)=1$ or 2, and $(g-b)=2$. In a particularly advantageous embodiment of the invention the image has a resolution of substantially 4 pels per mm or greater, and $g \leq 4$.

The invention also includes a method of coding a color image as defined above.

5 Claims, 4 Drawing Figures

COLOR DISPLAY APPARATUS AND METHOD OF CODING A COLOR IMAGE

BACKGROUND OF THE INVENTION

1. Field of the Invention

This invention relates to a display apparatus for producing a color image from a digitally coded representation of the image, and to a method of coding a color image.

2. Prior Art

The display of digital pictures (from external sources, or generated by computer) is becoming a major factor among computer users and developers. Displays have evolved from simple alphanumeric terminals to more general output devices, and the concept of the APA (all-points-addressable) display is now firmly established and bit-map devices are common. Inevitably, users are asking for improved pictorial output. Simple graphic displays are no longer adequate for many applications, and many users need the capability of displaying true images.

The most common way of describing the ability of the eye (or rather, of the whole Human Visual System—HVS) to observe detail (resolution) and contrast (grey levels) is to plot a curve of contrast sensitivity against spatial frequency. This is referred to as the "frequency model" and a graph is presented later in this specification (FIG. 1). A considerable amount of work has been done on measuring this curve under various conditions, and the first part of this specification summarises the essentials of the work in this area.

SUMMARY OF THE INVENTION

Another way of measuring the limitations of the HVS is to assess its ability to detect small targets against a background. This is referred to as the "target model" and is especially favoured by those working on military applications. Working from assumptions derived from the first body of work, we expected a correlation between the area of a target and the contrast needed for it to be detected. Experiment showed that in fact the linear size of the target (rather than the area) was the controlling factor, and we have discovered a theoretical justification for this.

It seems that no worker in this field has compared the results described by the frequency and target models of the HVS. If we do compare them, we find that they apparently conflict. We can show how these differences can be resolved, with important implications for the display of color images, and we can show that fewer bits are required for the display of color images than might be expected.

Accordingly, the present invention provides display apparatus for producing a color image in which the color of each picture element is defined by the intensities of component red, blue wherein the color green primaries and is coded as a binary number having r bits defining $2^r$ intensity levels for red, g bits defining $2^g$ intensity levels for green, and b bits defining $2^b$ intensity levels for blue, where $g<7$, $(g-r)=1$ or 2, and $(g-b)=2$.

Heretofore it was generally assumed that for the display of high quality color images up to 8 bits would be needed for each of three Red, Green and Blue primaries, i.e. 24 bits in all would be needed to define each picture element in the color image. The invention is therefore based on the surprising discovery that, for the average HVS, a maximum of 7 bits are needed for Green, with one or two bits less for Red, and two bits less for Blue. It will be appreciated that this provides substantial savings in storage in high quality image processing and graphics systems.

While 7 bits for Green is the maximum needed in any circumstances, we have found that in practice for the majority of applications using high quality color cathode ray tube (CRT) displays, which have a resolution of substantially 4 pels (picture elements) per mm or greater and are typically viewed at a distance of 400 mm, a maximum of only 4 bits are needed for Green, with correspondingly 2 bits less for Blue and 1 or 2 bits less for Red depending on the wavelength of the Red primary. In fact, we can usually make do with only 2 bits for Red giving the very convenient number of 8 bits (one byte) to define each picture element of the color image. It is to be noted that 8 is the maximum number of bits (for a resolution of 4 pels per mm) and that this is reduced for higher resolution displays. For lower resolution displays, the 8-bit color definition may still be used if a slight decrease in image quality is acceptable.

BRIEF DESCRIPTION OF THE DRAWINGS

An embodiment of the invention will now be described, by way of example, with reference to the accompanying drawings, in which.

Figure 1:
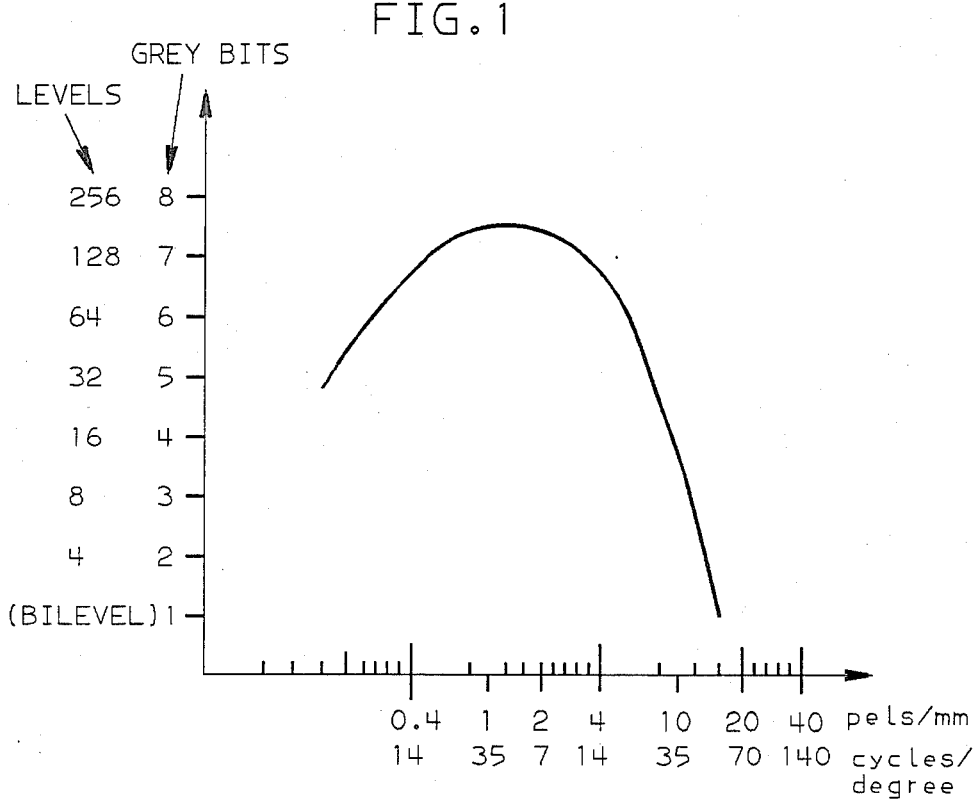
FIG. 1 is a graph illustrating the characteristics of the HVS according to the "frequency model"

For many years researchers have described and measured the limitations of the HVS in terms of the graph of detectable contrast plotted against spatial frequency. One especially useful presentation of the curve is that in which the number of intensity levels discernible (i.e. the contrast sensitivity, which is the reciprocal of the contrast—defined here as the difference in intensity between an object and its background, divided by the intensity of the background) is plotted against spatial frequency. Such a curve is shown in FIG. 1. The vertical axis is calibrated in the number of bits required to represent those levels. The horizontal axis shows spatial frequency in cycles per degree, and the equivalent in picture elements (pels) per millimetre for a CRT at normal viewing distance (400 mm). Variations in grey levels or detail outside the shaded area is not detectable to the average observer; any combination inside the shaded area should be detected under suitable viewing conditions.

Such curves are usually derived using sine-wave gratings whose frequency and contrast are varied. We may therefore read from the graph that, for example, observers will (on average) not be able to detect any grating which varies by less than one level in 180, or which has a spatial frequency greater than 60 cycles per degree. A typical image display with a raster of 4 pels/mm (14 cycles per degree) and 256 grey levels will therefore exceed the limitations of the HVS for grey levels, yet does not provide the full resolution that the observer could use.

The curve in FIG. 1 is derived from measurement of the ability of the eye to detect a linear feature (gratings). We also considered how well the HVS will perform at detecting a target (here defined as a small area with equal horizontal and vertical dimensions, and differing only in intensity from its background), and we expected that the detection of a target would be related to the area of the target. However, we conducted an experiment using observers to measure this relationship, and were surprised to find that detection of a target of given contrast was proportional to the linear size of the target instead of to its area.

After some study, we found that this was predictable by what we will call the "target model" of the HVS. Several workers have considered the performance of an ideal photon detector, and using this model we can derive the formula that relates the various parameters that affect the detection of a small target against a constant background:

$$C.A = k.S/D.\sqrt{(N.T.Q)}$$

where:

C is the contrast of the target,
A is the angular size of the target,
k is a constant that depends on the units of the other terms,
S is the signal-to-noise ratio needed for reliable detection,
D is the diameter of the collection aperture (the pupil),
N is the number of incident photons per unit area in unit time,
T is the integration time of the detector, and
Q is the quantum efficiency of the detector.

Using this formula we find that for conditions of constant background intensity, quantum yield for detection, aperture size, etc., then contrast multiplied by the angular (linear) size of a target should be constant.

Using approximate values for the terms in the formula, we found that contrast multiplied by target size should equal approximately 16 minutes of arc under the viewing conditions of the experiment referred to above. The figure previously calculated from the experimental results themselves was 12.5 minutes, a remarkably close result in view of the large approximations and ranges of the terms of the formula.

There is thus both experimental and theoretical evidence that the limitation on detection of a target of a given contrast is proportional to its size, rather than to its area. Modelling the receptors of the eye as simple photon detectors seems a valid method for describing its ability to detect targets, especially when the model is calibrated by experimental results.

Figure 2:
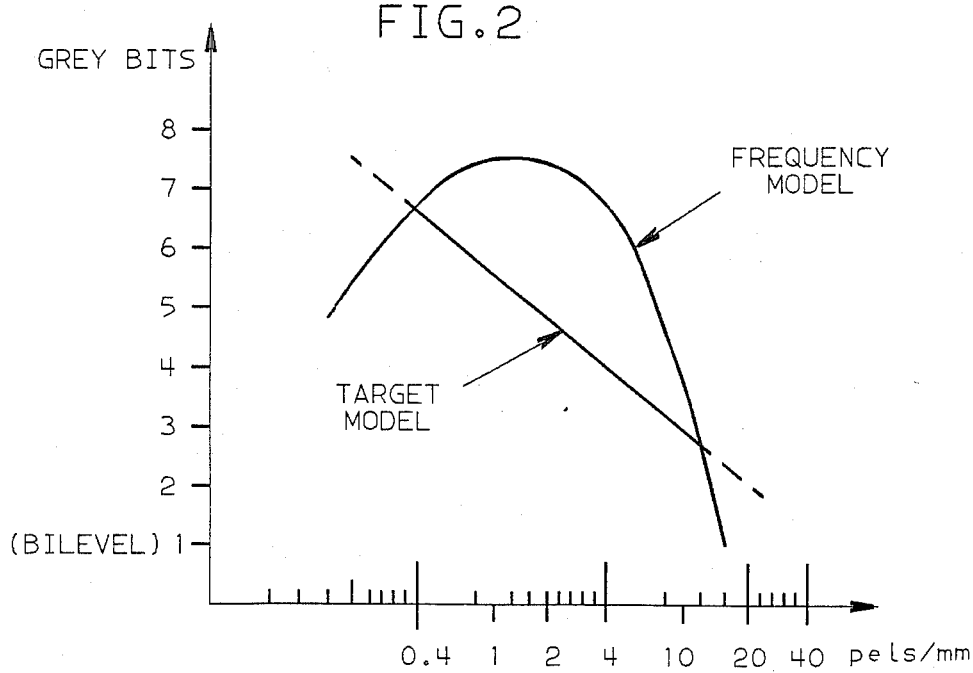
FIG. 2 is a graph illustrating the characteristics of the HVS according to the "target model", superimposed on that of the frequency model.

If we plot the limits suggested by the target model (as determined by experiment) on the same graph as FIG. 1 (the limits, also determined by appropriate experiments, as suggested by the frequency model), we get the combined graph shown in FIG. 2. The two curves differ significantly, and the striking feature of the combined graph is that there is a large part of the area under the original curve that is above the limit found for target detection. If we look at the portion of the graph at 4 pels/mm, we see that from the frequency experiments (using gratings) we should be able to detect features differing by about 1 part in 128 (7 bits of grey level), yet from the target model curve and from experiment we know that this is not true for all features.

The explanation for this is of course that the two curves were measured in different ways: one measures the detection of symmetric small patches (targets), and the other measures the detection of gratings (targets greatly extended in one dimension). There are two possible reasons for gratings being more detectable than targets: it might be that the regular pattern evokes some kind of resonant response in the HVS; or it might just be that for some reason the long dimension of each bar in the grating makes it more visible despite its small width.

To test which of these is the case, we carried out an experiment in which the visibility of a single bar from a grating was compared with that of the grating as a whole. It proved to be equally visible, indeed if anything more visible. (Relative visibility was simply measured by changing the viewing distance to find the point at which the object being observed merged with its background. This point is quite abrupt and repeatable). The bar was then gradually reduced in length; it remained equally visible until its length became about 5 times its width, at which point its visibility deteriorated down to the point at which it became the same size (and visibility) of the target of the appropriate size. Little difference was observed in the results for horizontal and vertical bars and gratings.

The conclusion we draw from these observations is that the frequency- based (grating) model and curve will in fact describe the limitations of the HVS for line-like features such as single bars or wires (but not edges, unless they are of very low contrast), where the length of the feature is at least 5 times its width. The target model curved will describe the limitations of the HVS for the more "regular" type of feature whose width and height are similar. Objects between these two descriptions would fall in the area between the two curves shown in FIG. 2.

These observations explain why screening (half-toning with two or more grey levels) works so well. Suppose we reduce a 4-pels/mm 256-grey-level picture to 16 grey levels as suggested by the target detection curve, and that some area in the original picture is at a grey level mid-way between two of the output possibilities. By representing the intermediate level by a pattern in which 50% of the pels are set to the level above the desired level and the remainder are set to the level below (preferably randomly distributed) then the eye will not be able to detect the individual pels (which admirably fit the definition of a "target"), and so the area will appear to have a smooth grey appearance at the desired (intermediate) level.

A screening method which produces few artificial linear features (such as the Error Diffusion algorithm) will therefore look better than one (such as the Ordered Dither algorithm) that tends to produce linear features which by their very nature are more detectable by the eye.

The graph shown in FIG. 2, with both curves plotted, gives us valuable insight into several observations. On a 4 pel/mm display, pictures displayed with four bits per pel (used fairly optimally by applying screening such as Error Diffusion) are almost indistinguishable from the same picture displayed with eight bits per pel. (If a slice near the center of an 8-bit-per-pel image is replaced with the same data Error Diffused to just 4 bits per pel, it is usually impossible to locate the slice, even with close inspection). This result is contrary to that which we would predict from looking at the upper curve in the graph, which indicates that at least 7 bits need to be used to reach the HVS limit. We suggest that in fact features in real pictures are of generally high contrast (or if of low contrast are rarely linear) and that almost invariably they will fall below the lower curve. Many pictures can be presented with just simple thresholding to 16 levels, but a good screening algorithm allows any picture—including computer generated pictures—to be treated as though they consisted of just regular ("target") features. For most practical purposes we may therefore use the lower, target detection frequency curve to design displays rather than the more demanding (and expensive) upper frequency curve.

Certain applications—such as radiography—do require that low contrast linear features be displayable, and for simplicity it might be wiser to use the upper curve as the guide for specialist research. In many cases, though, it will make more sense to process the image to bring the dynamic range of the image within the lower curve, hence increasing the probability of detection of all types of features. As a general rule, enhancement by image processing should always aim to bring the dynamic range of the result within that defined by the lower curve, so that features will be detectable by the observer whatever their shape.

The preceding describes the performance of the HVS under optimal conditions, where the picture being observed is monochromatic with a hue to which the eye is most sensitive (i.e. Green). The same results apply so long as the Green component of the color of the picture is at least as large as any other component, as with white, yellow, or green displays.

So far as we are aware, no experimenter has directly measured how contrast and spatial frequency sensitivity vary with the wavelength of light. We do have, however, the well known of curve of total eye sensitivity as a function of wavelength, and the above formula for the eye receptors as photon detectors shows that the contrast required for a given target to be detectable is proportional to the square root of the efficiency of the detector. That is, by re-ordering the above formula, we can show that K, the contrast required (the reciprocal of C), is given by:

$$K = Z.A.\sqrt{Q}$$

where Z is effectively a constant for the eye system over the range of normal luminance of displays (it depends on the terms for luminance, pupil diameter, signal-to-noise ratio, etc.); A is the angular size of the target, as before, and Q is the efficiency of the detector. From our experiment, the value of Z is 64 mm$^{-1}$ if A is the size of the target in mm, viewed at 400 mm, and Q is expresed as relative efficiency with a value of 1 at Green (550 nm).

If we take the values from the eye sensitivity curve at wavelengths of 450 nm and 650 nm (Blue and Red) we find that the eye is about one sixteenth as sensitive to these colors as it is to Green. If Q is one sixteenth of the value at Green, then K must be one quarter of its value at Green (the square root of the factor for Q). For a target to be detectable in these colors, it must therefore have four times the contrast of a Green target of the same size and luminance.

We may therefore draw an extremely important conclusion: the contrast needed for the detection of a feature is four times higher for Red and for Blue (at 650 nm and 450 nm respectively) than it is for Green (at 550 nm). The Red and Blue signals in an RGB representation of a picture will therefore always need two fewer bits than the Green signal. This conclusion is independent of the resolution of the device.

If we consider a color display device with a resolution of 4 pels/mm (and viewed at 400 mm) we can say that under optimum conditions we need just over seven bits for the Green component of an RGB picture, but only just over five bits each for Red and for Blue. We will never require more bits than this, whatever the viewing conditions. For a lower or higher resolution display fewer bits will be required.

Figure 3:
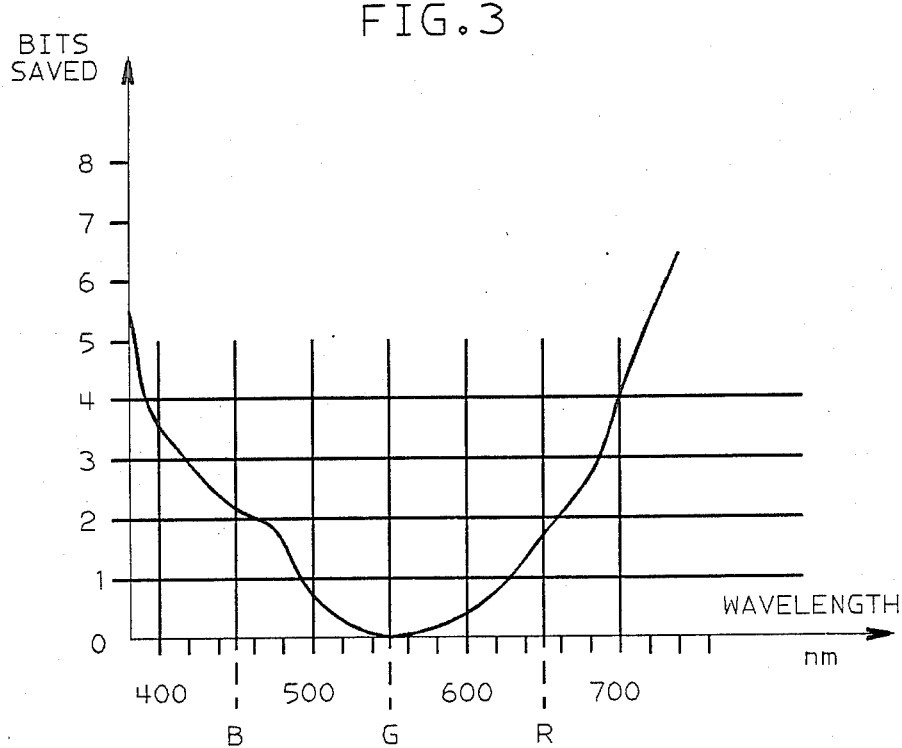
FIG. 3 is a graph of bits saved, relative to Green, as a function of wavelength.

The dominant wavelength of the RGB primaries used has a significant effect on the number of bits required. If (as is the case for many Red phosphors) the dominant wavelength of the Red primary is less than 650 nm, then more bits are required for Red than for Blue. FIG. 3 shows this effect by plotting the number of bits saved relative to Green as a function of wavelength. FIG. 3 is derived from the standard CIE eye sensitivity curve, uncorrected for minor variations required for color matching white which would tend to lower the Red part of the curve by about 0.3–0.5 bits.

These figures suggest that about 18 bits (7 for Green, 5 or 6 for Red, and 5 for Blue) are needed for the optimum display of color pictures, but we can reduce the requirements for color display still further if we use the conclusions of the target model discussed earlier. In practice, for a 4 pel/mm display, we will achieve equivalent results with just 4 bits per pel for the Green component, and FIG. 3 shows that we may assign one or two bits less for the Red component, and two bits less for the Blue component. If we take two bits for the Red component, this makes the convenient total of eight bits (one byte) for high-quality practical color display. Our experiments have shown that a color picture encoded to eight bits by simple Error Diffusion at this resolution shows no contouring or pel structure at normal viewing distance. For lower resolution cathode ray tube displays more bits would be needed for maximum quality. For example, FIGS. 2 and 3 show that a 2 pel/mm display would require 5 bits for Green, 3 or 4 bits for Red and 3 bits for Blue. However, if "photographic" quality is not required, as it rarely is in primarily graphics displays, the 8 bits mentioned above may be used down to a resolution of 2 pels/mm.

Since there is little point in providing image capability which exceeds that of the observer, a general-purpose color display is best designed to perform no better than the target model curve (see FIG. 2). Only if it is to be used for basic research, or if the detection of low contrast linear features are likely to be a very significant application area, should the frequency model curve (FIG. 1) be used as a design limit.

To summarise, for color images fewer bits are needed for each of the Red and Blue components as for the Green component. Under no circumstances is anything to be gained by using more than a total of 18 bits of intensity and color information for each pel of a color image, provided that the bits are assigned appropriately. The number of bits that may be saved for Red and Blue is dependent on the dominant wavelength of the color used to represent these primaries, and may be read off the graph shown in FIG. 3. For example, if the dominant wavelengths are 650 nm and 450 nm, then 2 bits may be saved for each color.

In practice the appropriate number of bits for the Green component of a color image may be determined from the lower curve of FIG. 2 for a given output resolution. The bits for the other two primaries (Red and Green) may then be deduced by subtracting the savings derived from FIG. 3. As an example, for a 4 pel/mm display we would use 4 bits for Green, and 2 each for Red and Blue. These may be conveniently assigned to a single byte. If this scheme is used, it is recommended that Green be placed in the most significant four bits so that images of real scenes may usually also be viewed satisfactorily on a monochrome display (Red and Blue, in that order, would be placed in the four least significant bits). As mentioned above, in many applications is it acceptable to use 8 bits down to a resolution of 2 pel/mm with only a slight loss of quality.

Although the above discussion mainly refers to the presentation of color pictures on electronic display devices, the conclusions are equally applicable to hard-copy output display devices such as color printers.

Figure 4:
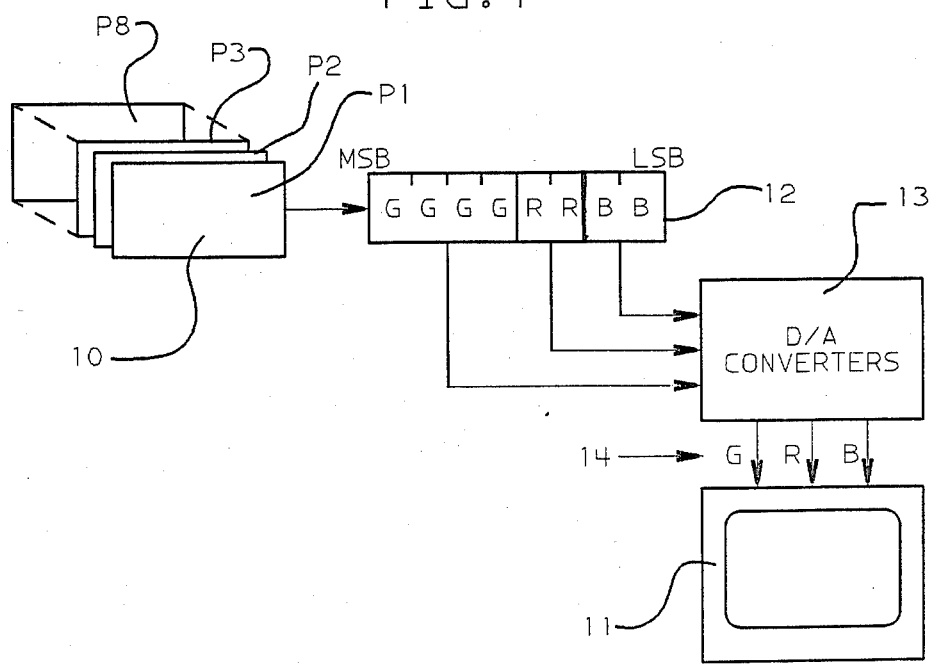
FIG. 4 is a block schematic diagram of a raster scan color CRT display apparatus according to the present invention.

FIG. 4 is a schematic diagram of a raster-scan color CRT display apparatus embodying the invention. It is to be understood that, except for the manner in which the image pels are coded, the physical organisation of the apparatus is conventional and therefore only the minimum of detail is shown.

A computer-generated color image to be displayed is stored in a frame buffer 10 having eight bit planes P1 to P8. Each pel of the image is coded as four Green bits (allocated to bit planes P1 to P4), two Red bits (allocated to bit planes P5 and P6), and two Blue bits (allocated to bit planes P7 and P8).

The image is displayed on a conventional color monitor 11 having a resolution of substantially 4 pels/mm and an image size of 1024×1024 pels. Thus, the frame buffer 10 also has 1024×1024 pel locations which map 1-to-1 to the screen of the monitor 11, and each pel is defined by the 8-bit binary number derived by taking the bits from corresponding bit locations in all eight bit planes in conventional manner.

Successive pels coded as above are read out from the frame buffer and entered into an 8-bit pel register 12. The Green bits occupy the four most significant positions in the register 12, followed by the Red and Blue bits in that order. Digital to analog converters 13 convert the Green, Red and Blue portions of each binary coded pel into green, red and blue analog signals 14 which control the intensity of the green, red and blue guns respectively of the monitor 11.

The reading out of the binary coded pels from the frame buffer 10 into the pel register 12, and the D/A conversion of the coded pels in the converter 13, is synchronised in known manner to the scanning raster of the monitor 11 such that each coded pel defines the intensity of the green, red and blue components of the image at a corresponding pel location on the screen of the monitor.

As we have shown above, the resultant image will, under normal viewing conditions for the great majority of practical situations, and if necessary after pre-processing the image prior to loading into the frame buffer, be indistinguishable from one produced using a greater number of bits for the Green, Red and Blue components of the image.

It is to be noted that a changeable color palette (color look-up table) will not normally be required using the invention, but nevertheless if this is desired it is the coding of the colors in the look-up table which should follow the principles discussed above.

I claim:

1. Display apparatus for producing a color image from a digitally encoded representation of said image whereby the coded representation of each multi-color picture element of said display apparatus is substantially reduced, and wherein the color of each said picture element is defined by the intensities of the red, blue and green color components, comprising means for coding each picture element as a binary number having r bits defining $2^r$ intensity levels for red, g bits defining $2^g$ intensity levels for green, and b bits defining $2^b$ intensity levels for blue, where $g \leq 4$, $(g-r)=2$, and $(g-b)=2$.

2. An apparatus according to claim 1 wherein $g=4$ and $r=b=2$.

3. A method of coding a color image and reducing the storage capacity required to store the multi-color components of each picture element in a visual display, the color of each picture element bieng defined by the intensities of the red, blue and green component colors the step of coding each picture element as a binary number having r bits defining $2^r$ intensity levels for red, g bits defining $2^g$ intensity levels for green, and b bits defining $2^b$ intensity levels for blue, where $g \leq 4$, $(g-r)=2$, and $(g-b)=2$.

4. A method according to claim 3 wherein $g=4$ and $r=b=2$.

5. A method according to claim 4, wherein the g bits comprise the most significant bits of the binary number.

* * * * *